United States Patent [19]

Lutz

[11] Patent Number: 4,842,113
[45] Date of Patent: Jun. 27, 1989

[54] SYSTEM FOR CONTROLLING THE FREE-WHEELING RELEASE OPERATION OF A MOTOR VEHICLE CLUTCH

[75] Inventor: Dieter Lutz, Schweinfurt, Fed. Rep. of Germany

[73] Assignee: SACHS-Systemtechnik GmbH, Fed. Rep. of Germany

[21] Appl. No.: 464,997

[22] Filed: Feb. 8, 1983

[30] Foreign Application Priority Data

Mar. 11, 1982 [DE] Fed. Rep. of Germany ....... 3208715

[51] Int. Cl.$^4$ .............................................. B60K 41/28
[52] U.S. Cl. ............................. 192/0.055; 192/0.082; 192/0.094; 192/1.45
[58] Field of Search ................. 192/0.044, 0.09, 0.052, 192/0.055, 0.058, 0.092, 0.08, 0.076, 0.075, 4 A, 3 M, 0.094, 0.082

[56] References Cited

U.S. PATENT DOCUMENTS

| | | | |
|---|---|---|---|
| 1,968,951 | 8/1934 | McGrath | 192/0.075 X |
| 1,999,284 | 4/1935 | Colvin | 192/0.055 |
| 2,031,807 | 2/1936 | Werner | 192/0.092 X |
| 2,033,590 | 3/1936 | Saives | 192/0.055 |
| 2,055,505 | 9/1936 | Sanford | 192/0.055 |
| 2,065,980 | 12/1936 | Maybach | 192/0.055 |
| 2,163,872 | 6/1939 | Drabin | 192/0.055 |
| 2,760,610 | 8/1956 | Pracher | 192/0.052 |
| 2,765,889 | 10/1956 | Court | 192/0.09 |
| 3,335,830 | 8/1967 | Cote de Castelet | 192/0.092 |
| 3,548,980 | 12/1970 | Schmidt et al. | 192/0.09 |
| 3,645,366 | 2/1972 | Numazawa et al. | 192/0.092 X |
| 3,752,284 | 8/1973 | Brittain et al. | 192/0.052 X |
| 4,084,672 | 4/1978 | Avins | 192/0.055 |

FOREIGN PATENT DOCUMENTS

| | | |
|---|---|---|
| 0049535 | 4/1982 | European Pat. Off. . |
| 0008495 | 3/1986 | European Pat. Off. . |
| 3028250 | 7/1980 | Fed. Rep. of Germany . |
| 3028601 | 8/1981 | Fed. Rep. of Germany . |
| 3043347 | 7/1982 | Fed. Rep. of Germany . |
| 2385902 | 10/1978 | France . |
| 240522 | 9/1925 | United Kingdom . |
| 395504 | 7/1933 | United Kingdom . |
| 407031 | 3/1934 | United Kingdom . |
| 408310 | 4/1934 | United Kingdom . |
| 442735 | 2/1936 | United Kingdom . |
| 2080910 | 1/1982 | United Kingdom . |
| 1599526 | 10/1982 | United Kingdom . |

Primary Examiner—George H. Krizmanich
Attorney, Agent, or Firm—Toren, McGeady, Stanger, Goldberg & Kiel

[57] ABSTRACT

A clutch (3) which can be engaged and released by a controllable clutch drive (11) is arranged in the torque transmission path between an engine (1) and a gear transmission (5) of a motor vehicle. By means of a control switch (15) the clutch (3) is released whereby the vehicle can coast free-wheeling, saving fuel, with the engine (1) working in idling rate. On actuation of a brake pedal (15) a control circuit (13) engages the clutch (3) and at the same time shuts off the fuel supply to the engine (1) by means of a fuel valve (23). The engine (1) thus brakes the vehicle without additional fuel consumption. Alternatively the control circuit (13) can have constantly shut off the fuel supply of the engine (1) in free-wheeling operation. Under control of a pressure detector (45) detecting the suction in a servo-brake unit (41) the control circuit (13) engages the clutch (3) when the pressure rises to values which no longer guarantee operation of the brake unit. The engine (1), normally stationary in free-wheeling operation, is rotated with the fuel supply shut off and generates the suction necessary for the working of the brake unit (41). Before the clutch (3) is engaged the control circuit (13) switches on a starter motor (47) which makes the drive-output rotation rate of the engine (1) equal to the rotation rate at the input shaft (25) of the gear transmission (5).

10 Claims, 1 Drawing Sheet

SYSTEM FOR CONTROLLING THE FREE-WHEELING RELEASE OPERATION OF A MOTOR VEHICLE CLUTCH

BACKGROUND OF THE INVENTION

The invention relates to a clutch drive control system and particularly to a control system for a clutch arranged in the torque transmission path between an engine and a gear transmission of a motor vehicle, which is releasable and engageable by means of a controllable drive device, wherein the release operation of the drive device is controllable by means of a free-wheel control switch.

In German Patent Application No. P 30 28 250 an automatic actuating device for a motor vehicle clutch is described. The actuating device responds to control of a manually actuatable free-wheel control switch and releases the clutch when the accelerator pedal is in the idling position. In this way the fuel consumption can be reduced. In some driving situations, for example in driving downhill, the brake effect of the engine is however desired. In the automatic actuating device as described the free-wheeling function must be switched off manually by means of the free-wheel control switch for this purpose. The operation of the control switch distracts the driver from what is happening in traffic and the advantage of fuel-saving is lost by switching off of the free-wheel function.

The invention is directed toward providing a control system for a motor vehicle clutch releasable in free-wheel operation, which simplifies the actuation required according to the driving situation.

SUMMARY OF THE INVENTION

Briefly, the present invention may be described as a control system for a clutch arranged in the torque transmission path between an engine and a gear transmission having shiftable gears. The clutch is releasable and engageable by means of a controllable drive device. The release operation of the drive device is controllable by means of a free-wheel control switch. A control circuit responding to the free-wheel control switch and to the actuation of a brake of the motor vehicle holds the clutch released when the free-wheel operation of the motor vehicle is switched on by means of the free-wheel control switch and engages the clutch on actuation of the brake. By actuation of the brake, for example the foot brake but possibly also the hand brake, the free-wheel function is interrupted and the engine is coupled with the gear transmission. The comfort of operation is in this way considerably improved, especially in downhill driving.

In a preferred embodiment the control circuit blocks the fuel supply to the engine through a controllable fuel valve when the clutch is engaged. Due to this measure the fuel consumption can be reduced in addition to the fuel saving due to the free-wheel operation. While in free-wheel operation with the clutch released the engine works at idling rotation rate, in braking operation with the clutch engaged the fuel supply is interrupted. To avoid stalling of the engine, the control circuit monitors the engine rotation rate and releases the clutch again with the fuel supply switched on when the engine rotation rate decreases below a predetermined rotation rate value at which the engine does not yet stop.

The control circuit preferably also monitors the input rotation rate of the gear transmission and ensures that the clutch is not engaged if the engine would thereby be braked to a rotation rate at which it would stop. Since for design reasons the input shaft of the gear transmission in conventional transmission constructions is inaccessible or difficult of access, the input rotation rate is preferably ascertained from the drive-output rotation rate by multiplication with a factor dependent upon the transmission gear engaged in each case and thus the respective transmission ratio of the gear. If the input rotation rate of the gear lies below a value at which the engine would stop, the clutch is not engaged.

The control circuit or a separate program control system controls the clutch within a predetermined time duration out of a position of commencing torque transmission into a position with predetermined transmission torque. The time duration is made so long that the brake retardation occurring in the engagement of the clutch has little or no effect upon the driving comfort. The predetermined engagement time expediently lies between 0.3 and 2 seconds, preferably above 1 second.

The transmission torque set by the control circuit and/or the time duration available until this transmission torque is reached are expediently variable in steps by means of a control switch. The control switch can be an acceleration switch or a switch responding to the inclination of the motor vehicle. The acceleration switch or the inclination switch responds for example during travel on a bend and surprisingly prevents the clutch from being engaged completely or too quickly for the driver during travel on the bend, whereby the driving behaviour of the vehicle would be modified unpredictably for the driver. The acceleration switch or inclination switch controls the clutch through the control circuit so that clutch engagement is only partially effected or the engagement duration is prolonged.

The control switch which determines the transmission torque and/or the clutch engagement duration can also respond to the state of actuation of the brake and become effective for example in two different actuation stages of the brake. When the brake is "touched" the clutch is merely partially engaged, but the fuel supply is already blocked. In a second actuation stage leading already to braking of the vehicle the control switch instigates the full engagement of the clutch. The control switch can here respond to the pressure in the brake cylinder or to the actuation travel of the brake pedal or the like.

A further improvement can be achieved in that the control circuit completely engages the clutch within the predetermined engagement time duration and disengages it immediately after the end of the actuation of the brake or with delay by a predetermined delay time which is shorter than the predetermined engagement duration. In this way the engine braking torque can be controlled by way of the brake of the vehicle. At the commencement of actuation of the brake the clutch begins to engage continuously. The engagement operation is interrupted if the braking operation is broken off. The clutch remains in the engaged condition for the predetermined delay time which is possessed on breaking off of the braking operation. After the elapse of the predetermined delay time the clutch is completely released. If before the elapse of the predetermined delay time the brake is actuated afresh, the clutch engagement is continued, in place of release, and the transmission torque of the clutch is increased. The condition of engagement of the clutch is thus controlled by the duration of the brake actuation.

In another embodiment of the invention the fuel supply to the engine is constantly shut off when the vehicle is in free-wheel operation. Thus the engine is stationary during free-wheel operation. This has the consequence that in motor vehicles with servo-brake units the pressure in a servo-brake suction pressure reservoir ordinarily fed by the motor through the suction conduit or a separate suction pump increases on repeated actuation of the brake. In order to prevent failure of the servo-brake unit, the control circuit responds for preference to the pressure of the reservoir and engages the clutch when the pressure in the reservoir rises above a first predetermined value. When the clutch is engaged the engine is rotated by the thrust of the vehicle and the reservoir is supplied with suction pressure. If the pressure in the reservoir drops below a second predetermined pressure value, the clutch is released.

In order to minimize the clutch engagement jerk exerted upon the vehicle in clutch engagement, it is expediently provided that the control circuit switches on a starter motor of the motor vehicle before the clutch is engaged. The starter motor rotates the engine of the motor vehicle with the fuel supply shut off as before, and makes the drive-output rotation speed of the engine equal to the input rotation speed of the gear transmission. The input rotation speed of the gear transmission is expediently monitored by the control circuit and the starter motor is switched on only above a predetermined input rotation speed which expediently lies above the idling rotation speed. It has also proved favourable if in addition the engine rotation speed is monitored and the clutch is engaged only when the starter motor is rotating the vehicle engine with a predetermined minimum rotation rate. In this way, when mechanical suction pumps are used it can be ensured that they generate the necessary suction pressure. If as for example in gas engines the suction in the suction manifold of the engine is utilized for the servo-brake unit, it is sufficient if the clutch is engaged not completely but only partially, as explained above.

The clutch engagement operation controlled in dependence upon the suction pressure of the servo-brake reservoir is frequently surprising to the driver. It is therefore preferably provided that the control circuit engages the clutch for the charging of the reservoir only if the brake is actuated at the same time.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
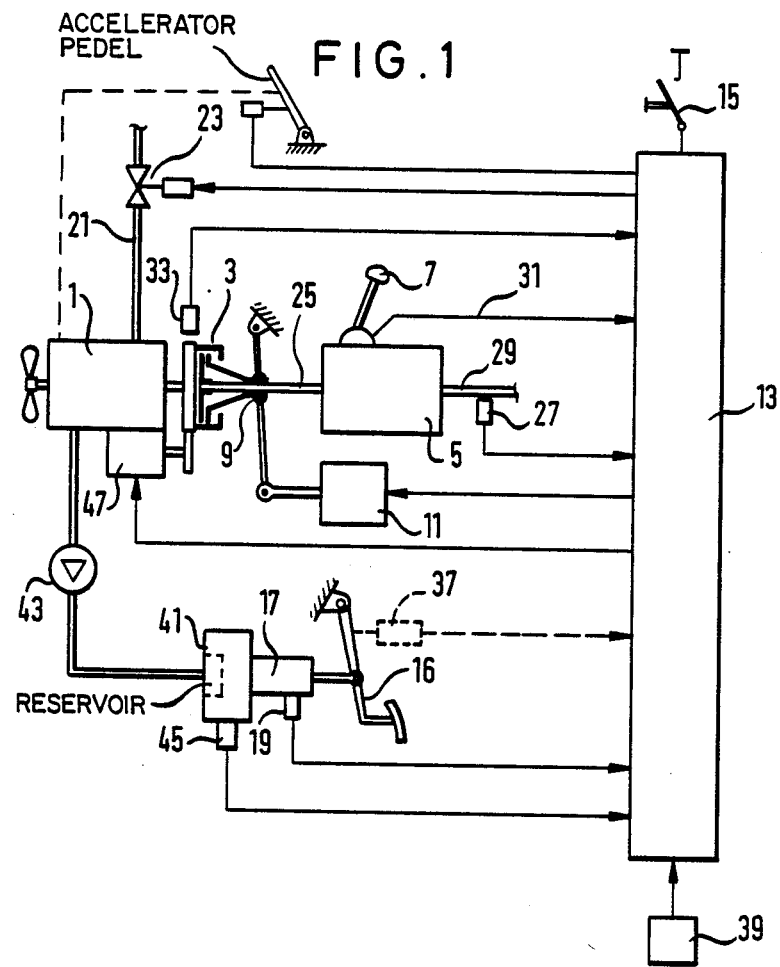
FIG. 1 shows a diagrammatic representation of an engine-transmission unit with associated clutch control system and FIG. 2 shows an illustration of the torque transmitted by the clutch in its engagement, in dependence upon the time t.

In FIG. 1 an engine 1 of a motor vehicle is coupled with a transmission 5 through a dry friction plate clutch 3, the ratios of which transmission can be changed by a gear change lever 7 with the clutch 3 disengaged. A clutch drive device 11, which releases the normally engaged clutch 3, is coupled to a releaser 9 of the clutch 3. The clutch drive 11 is controlled by a control circuit 13 in dependence upon the position of a free-wheel control switch 15. When free-wheel operation of the motor vehicle is set on the control switch 15 and the accelerator pedal (not shown) is situated in its rest position, the control circuit 13 releases the clutch 3 by means of the clutch drive 11, whereby the engine 1 rotates at idling rotation rate and the vehicle coasts without being braked by the engine 1. In this way the fuel consumption can be reduced. The clutch operation for starting or for changing gears can likewise be controlled in dependence upon rotation rate and/or speed and/or time by way of the control circuit 13. The releaser 9 can however additionally be connected with a clutch pedal.

Despite the fact that the control switch 15 is set into the free-wheel position, the clutch 3 is engaged when a pedal 16 of the vehicle brake is actuated. A pressure detector 19 detecting the pressure in the brake cylinder 17 delivers a tripping signal to the control circuit 13 on "touching" of the brake pedal 16. After a short delay time $\tau_1$ the control circuit 13 subsequently engages the clutch completely during a predetermined clutch operating duration or engagement duration $\tau_2$. The clutch drive 11 shifts the releaser 9 during the engagement time $\tau_2$ so that the torque M transmitted by the clutch 3 increases during the engagement time $\tau_2$ steadily up to its maximum value $M_{max}$ with the clutch fully engaged. At the same time the control circuit 13 blocks a fuel valve 23 which is arranged in a conduit 21 supplying fuel to the engine. The engine 1 thus supports the braking action of the brake without consuming additional fuel.

The clutch engagement operation is instigated in dependence upon the rotation rate of an input shaft 25 of the transmission 5. Since the rotation rate of the input shaft 25 can be detected only with relatively great construction expense, the rotation rate of a drive-output shaft 29 of the transmission 5 is measured by means of a rotation rate detector 27, for example through the speedometer shaft, and the rotation rate of the input shaft 25 is deduced from the transmission ratio. A signal corresponding to the gear position of the transmission 5 is fed through a lead 31 to the control circuit 13. The control circuit 13 instigates the operation of engagement of the clutch 3 only when the rotation rate of the input shaft 25 lies above a predetermined rotation rate. The predetermined rotation rate threshold is selected as low as possible and lies for example at 500 revolutions per minute so that with the brake pedal 16 actuated and the fuel supply shut off, the engine 1 is coupled as long as possible with the transmission without being braked to rotation rates at which it would stop. A rotation rate detector 33, for detecting the rotation of the clutch flywheel, controls the clutch release operation through the control circuit 13 so that the clutch is re-engaged on falling short of the predetermined rotation rate threshold for example of 500 revolutions per minute.

Figure 2:
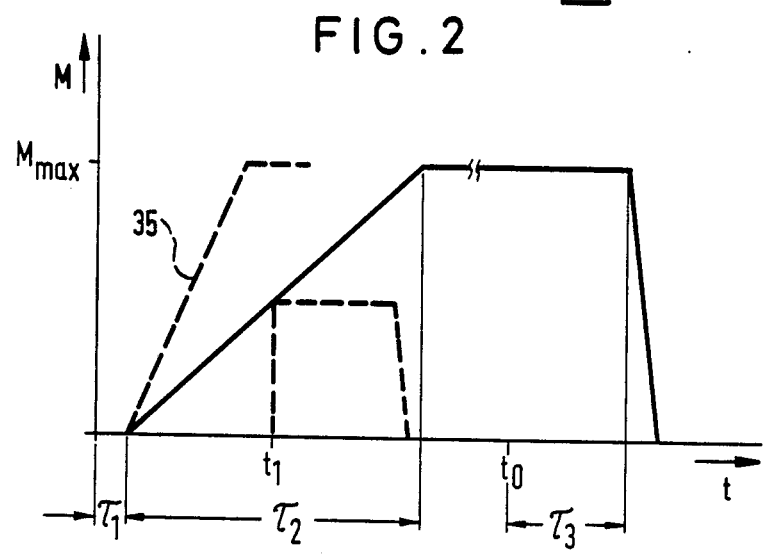

The clutch engagement time $\tau_2$ predetermined by the control circuit 13 is made as long as possible and amounts for example to two seconds, in order to minimize the jerk occurring on clutch engagement. In addition it can be provided that the control circuit 13 can engage the clutch 3 with different speeds, as indicated by a chain line 35 in FIG. 2. For this purpose the pressure detector 19 can respond to two different pressure thresholds. In place of the pressure detector 19, distance-dependently switching switches 37 can also be provided which actuate the control circuit 13 in one or more steps. Finally the control circuit 13 can respond to a retardation detector 39 or an inclination detector which responds in one or two steps to the vehicle accelerations occurring in driving or to the road inclination and varies the clutch engagement duration, so that, to the extent possible, the engagement jerk is not noticeable. The acceleration switch 39 switches on the slow clutch engagement duration if the brake retardation of the vehicle brake is slight. The clutch engagement duration can be shortened if the vehicle brake is in any case braking the vehicle heavily. In the case of an inclination switch this controls the control circuit 13 so that in the case of a major downward inclination the clutch 3 is engaged quickly, while in the case of a slight inclination the engagement duration is made longer.

The control circuit 13 keeps the clutch 3 engaged as long as the brake is actuated. After release of the brake, for example at the time $t_0$ (FIG. 2), and the elapse of a predetermined delay time $\tau_3$ for example of 0.5 seconds to 1 second, the control circuit 13 delivers to the clutch drive 11 a control signal which releases the clutch 3 quickly, for example within 0.2 seconds. If the brake operation is interrupted during the engagement of the clutch 3, as represented at $t_1$ in FIG. 2, the clutch drive 11 holds the releaser 9 in the momentary position for the duration of the time delay $\tau_3$. If before the elapse of the time delay $\tau_3$ the brake is actuated afresh, the clutch drive 11 continues the engagement operation from its momentary position. Otherwise the clutch is released after the elapse of the delay time $\tau_3$. In this way the engine braking moment transmitted by the clutch can be controlled by the time duration of brake actuation.

The brake pedal 16 acts through a servo-brake unit 41 upon the brake cylinder 17. The servo-brake unit 41 comprises a reservoir (not shown) which is charged with negative pressure through a suction pump 43 or through the suction system (not shown) of the engine 1 when the engine 1 is rotating. By repeated actuation of the brake, for example for the control of the engine brake torque, the pressure in the reservoir can rise, by reason of halting of the engine 1, so far that the servo-brake unit 41 fails. With the free-wheel control circuit as explained above in which the engine 1 works in idling operation with the clutch disengaged and thus its fuel supply is shut off only on brake actuation, this situation can occur only in exceptional cases. In another embodiment the control circuit 13 can shut off the fuel supply through the fuel valve 23 throughout the time during which the free-wheel operation is switched on by means of the control switch 15. In such an embodiment the suction reserve of the servo-brake unit 41 is relatively quickly exhausted. In order to remedy this without additional fuel consumption, a pressure detector 45 monitors the pressure in the reservoir of the servo-brake unit 41. The control circuit 13 engages the clutch 3 when the pressure in the reservoir rises above a threshold which no longer guarantees operation of the servo-brake unit 41. With the clutch 3 engaged the engine 1 is rotated despite the shutting off of the fuel supply and drives the suction pump 43 or generates suction in the suction system. As soon as the pressure in the reservoir of the servo-brake unit 41 has dropped sufficiently, the clutch 3 is disengaged again. The engagement of the clutch 3 for the re-charging of the reservoir of the servo-brake unit 41 may surprise the driver. In order to avoid this, the engagement operation is instigated only when the brake pedal 16 is additionally actuated.

With the clutch disengaged and the fuel supply constantly shut off, in free-wheel operation the engine 1 is halted. In order to reduce the engagement jerk in the engagement of the clutch, the control circuit 13 switches on a starter motor 47 of the engine 1 before the clutch 3 is engaged. The starter motor 47 makes the drive-output rotation rate of the engine 1 equal to the rotation rate of the input shaft 25 of the vehicle coasting in idling operation. Through the rotation rate detector 33 the control circuit monitors the drive-output rotation rate of the engine 1 and begins to engage the clutch 3 when the rotation rate has reached a predetermined minimum rotation rate between 100 and 300 revolutions per minute. The engagement of the clutch is moreover controlled in dependence upon the rotation rate of the input shaft 25, which is calculated from the drive-output rotation rate ascertained by the rotation rate indicator 27 and the gear position of the transmission 5. Especially when a suction pump is used to generate the suction necessary for the servo-brake unit 41, in this way it is ensured that the clutch is engaged only when an engine rotation rate lying above the idling rotation rate and necessary for the operation of the suction pump is reached when the clutch 3 is engaged. If the suction is generated by way of the suction system, the clutch 3 may be only partially engaged in order to keep the engagement jerk as small as possible.

While specific embodiments of the invention have been shown and described in detail to illustrate the application of the inventive principles, it will be understood that the invention may be embodied otherwise without departing from such principles.

What is claimed is:

1. Driving and braking system for a motor vehicle comprising an internal combustion engine (1) having a torque drive path, a gas pedal operatively connected to said engine for controlling engine operation, a clutch (3) located in the torque drive path, a clutch drive device (11) for operatively releasing and engaging said clutch, a brake device, a brake pedal (16) for operating said brake device, a manually actuatable control switch (15) for controlling a free-wheel release operation of said clutch, a first sensor (33) for detecting the idling operational position of said gas pedal, a second sensor (19;37) for detecting the operation of said brake pedal (16), a control circuit (13) connected to said clutch drive device (11), said control switch (15), said first sensor (33) and said second sensor (19;37) for controlling said drive device (11) when said control switch (15) is switched on for disengaging said clutch (3) when said brake pedal (11) is actuated, wherein the improvement comprises a fuel supply conduit (21) connected to said engine, a fuel valve (23) in said supply conduit (21) for controlling fuel flow therethrough to said engine, said control circuit (13) operably connected to said fuel valve so that when said control switch (15) is switched on for effecting free-wheeling operation, said control switch opens said fuel valve (23) when said clutch (3) is disengaged and closes said fuel valve (23) when said clutch (3) is engaged.

2. System, as set forth in claim 1, wherein said first sensor (33) is an rpm sensor for detecting the rpm of the internal combustion engine (1) and said first sensor is connected to said control circuit so that said control circuit opens said fuel valve (23) when said control switch is switched on for effecting free-wheeling operation when the number of rpm is less than a preset rpm value.

3. System, as set forth in claim 1, wherein a gear transmission (5) is arranged in the torque transmission path spaced from said combustion engine (1), said clutch is located in the torque transmission path between said internal combustion engine and said gear transmission and a device for determining the input rpm of said gear transmission (5) and said device being connected to said control circuit (13) so that said clutch (3) is engaged only in free-wheeling operation when said brake pedal (16) is actuated if the input rpm of said gear transmission (5) is above a preset rpm value.

4. System, as set forth in claim 1, wherein said control circuit (13) controls clutch engagement speed of said clutch drive device (11) in speed stages depending on said second sensor (19;37) so that the clutch engagement speed increases with increasing brake retardation of said brake device (17,41).

5. System, as set forth in claim 1, wherein said control circuit (13) controls the shifting position of said clutch drive device (11) and determines the torque transmittable by said clutch (3) in position stages depending on said second sensor (19;37) so that the torque transmitted increases with increasing brake retardation of said brake device (17,41).

6. Driving and braking system as set forth in claim 1, wherein said control circuit 13 includes a preset time delay for delaying the disengagement of said clutch by a preset time period at the end of the actuation of said brake pedal (16).

7. System, as set forth in claim 1, wherein said brake device (17, 41), includes a servo-brake unit with an under-pressure storage reservoir in communication with said internal combustion engine (1), a pressure sensor (45) for registering the pressure in said reservoir and said pressure sensor (45) being connected to said control circuit (13) for engaging said clutch (3) in free-wheeling operation at least partially if the pressure in said reservoir increases above a first predetermined pressure value and disengages said clutch (3) when the pressure in said reservoir falls below a second predetermined pressure value.

8. System, as set forth in claim 1, wherein said internal combustion engine (1) includes a starter motor (47), said control circuit (13) connected to said starter motor (47) for switching on said starter motor if said clutch (3) is disengaged and the internal combustion engine (1) is stopped prior to the engagement of said clutch (3).

9. System, as set forth in claim 8, wherein a gear transmission is located in the torque drive path in spaced relation to said internal combustion engine, said clutch (3) is located in said torque drive path between said internal combustion engine (1) and said gear transmission (5), a device (27, 31) connected to said control circuit (13) for determining the input rpm of said gear transmission (5) for switching on said starter motor (47) in free-wheeling operation only if the input rpm of said gear transmission (5) is above a pre-determined rpm value.

10. System, as set forth in claim 9, wherein an rpm sensor (33) is arranged for detecting the rpm of said internal combustion engine (1) and is connected to said control circuit (13) for engaging said clutch (3) in free-wheeling operation only when the detected rpm of said internal combustion engine (1) is above a predetermined rpm value.

* * * * *